(12) United States Patent
Iwano

(10) Patent No.: US 7,727,618 B2
(45) Date of Patent: Jun. 1, 2010

(54) DECORATIVE MOLDED BODY, KEY TOP FOR A PUSHBUTTON SWITCH, AND KEY SHEET FOR THE PUSHBUTTON SWITCH

(75) Inventor: Shinya Iwano, Ishikawa-Gun (JP)

(73) Assignee: Polymatech Co., Ltd., Tokyo (JP)

( * ) Notice: Subject to any disclaimer, the term of this patent is extended or adjusted under 35 U.S.C. 154(b) by 66 days.

(21) Appl. No.: 11/639,298

(22) Filed: Dec. 15, 2006

(65) Prior Publication Data

US 2007/0148417 A1    Jun. 28, 2007

(30) Foreign Application Priority Data

Dec. 26, 2005    (JP) .............................. 2005-373123

(51) Int. Cl.
*B32B 5/16* (2006.01)
*H01H 3/12* (2006.01)
*H01H 13/14* (2006.01)

(52) U.S. Cl. .................. 428/204; 428/209; 200/308; 200/341; 200/345; 400/490

(58) Field of Classification Search ......... 200/502–572, 200/308, 314, 341, 345; 400/490–495; 428/195.1, 428/204, 209
See application file for complete search history.

(56) References Cited

U.S. PATENT DOCUMENTS

| | | | | |
|---|---|---|---|---|
| 4,343,975 | A * | 8/1982 | Sado | 200/314 |
| 4,937,408 | A * | 6/1990 | Hattori et al. | 200/314 |
| 5,234,744 | A * | 8/1993 | Kenmochi | 428/195.1 |
| 6,196,738 | B1 * | 3/2001 | Shimizu et al. | 400/490 |
| 2004/0195203 | A1 | 1/2004 | Hayashizaki et al. | |
| 2006/0169105 | A1 * | 8/2006 | Lien et al. | 79/1 |

FOREIGN PATENT DOCUMENTS

| | | |
|---|---|---|
| DE | 202005009964 U1 | 10/2005 |
| EP | 0424173 | 4/1991 |
| EP | 1132932 | 9/2001 |
| EP | 1313118 | 5/2003 |

(Continued)

OTHER PUBLICATIONS

Machine Translation of the Detailed Description of JP 2003-109450 A. Imported as JP2003_109450detail.pdf.*

(Continued)

*Primary Examiner*—Mark Ruthkosky
*Assistant Examiner*—Gerard T Higgins
(74) *Attorney, Agent, or Firm*—Cermak Kenealy Vaidya & Nakajima LLP; Tomoko Nakajima

(57) ABSTRACT

A decorative molded body can be structured such that an inside thereof looks three-dimensional from a surface thereof, the decorative molded body being a substituted for a decorative molded body of the related art. An example of a decorative molded body can include a three-dimensional base pattern layer having, on a bottom surface of a transparent molded body, a transparent printing layer and a brilliant layer containing brilliant particles, in which the brilliant layer is raised brightly and three-dimensionally on the transparent printing layer as a background. The decorative molded body is excellent in design, and structured so that irregular shapes formed of portions where the transparent printing layer is provided and other portions can look three-dimensional from a surface of the molded body.

17 Claims, 7 Drawing Sheets

FOREIGN PATENT DOCUMENTS

| | | |
|---|---|---|
| JP | 11-320570 | 11/1999 |
| JP | 2000207985 | 7/2000 |
| JP | 2000268667 | 9/2000 |
| JP | 2001057125 | 2/2001 |
| JP | 2002367474 | 12/2002 |
| JP | 2003-109450 | 4/2003 |
| JP | 2005071728 | 3/2005 |

OTHER PUBLICATIONS

Machine Translation of the Detailed Description of JP 11-320570 A. Imported as JP11_320570detail.pdf.*

Search Report for EP Patent App. No. 06026412.4 (Jan. 30, 2009).

* cited by examiner

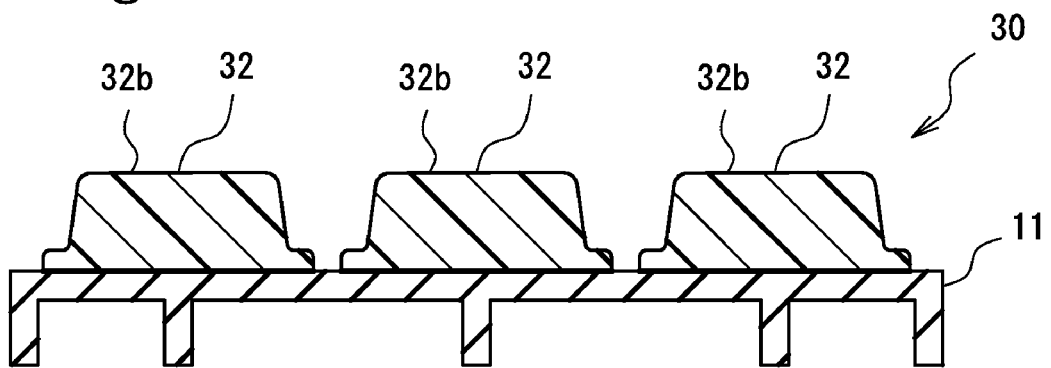
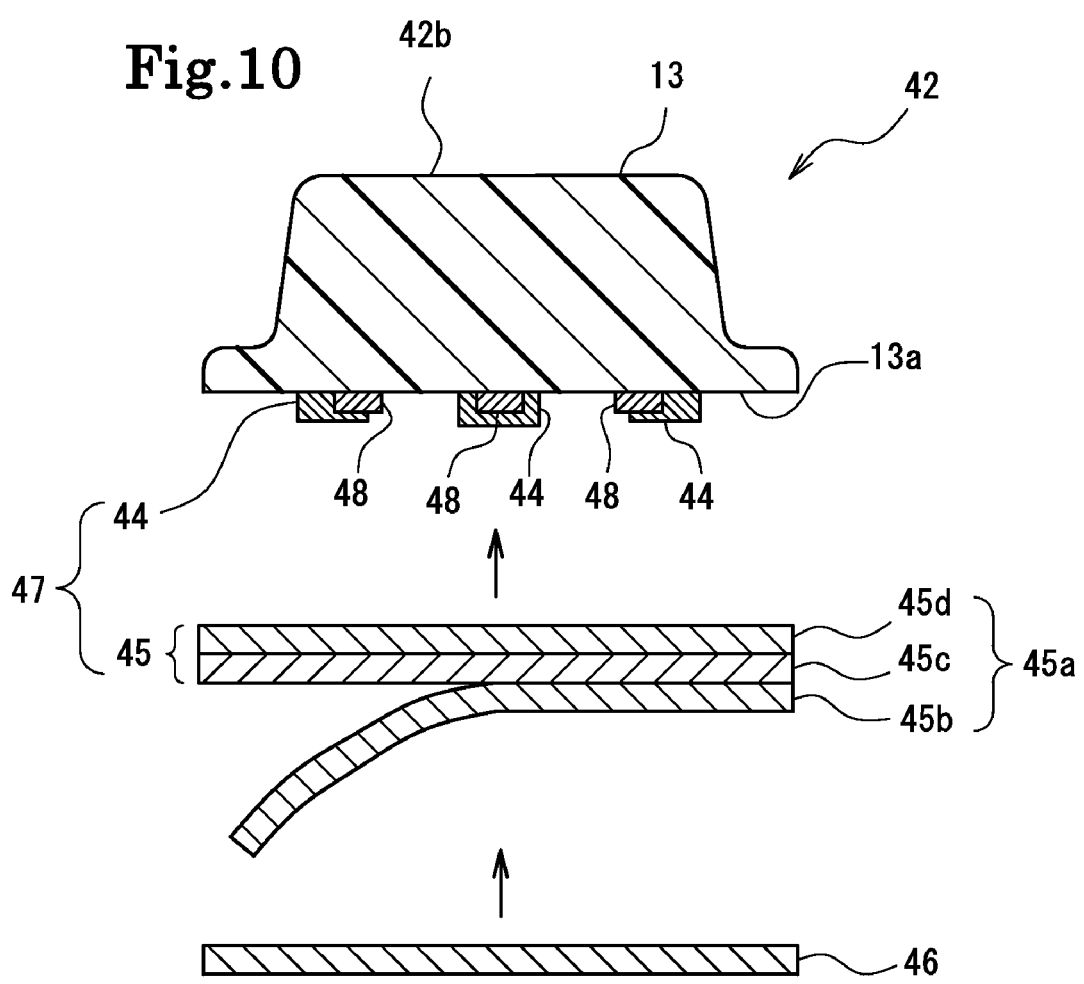

DECORATIVE MOLDED BODY, KEY TOP FOR A PUSHBUTTON SWITCH, AND KEY SHEET FOR THE PUSHBUTTON SWITCH

BACKGROUND OF THE INVENTION

1. Field of the Invention

The present invention relates to a decorative molded body for use in a variety of electronic instruments such as a cellular phone, a mobile information terminal, and an AV instrument. More specifically, the present invention relates to a key top for a pushbutton switch for use in an operation portion of the variety of electronic instruments.

2. Description of the Related Art

Required of a variety of electronic instruments such as a cellular phone, a mobile information terminal, and an AV instrument, are not only functions thereof but also excellent exterior designs. In particular, the cellular phone is significantly required to satisfy those. Not only of a body of the cellular phone but also of decorated molded bodies such as a pushbutton switch and a liquid crystal display plate, high-quality designs are required. For example, there are provided such the decorations that a surface, in which even a resin material is used, of the molded body is finished in a specular gloss tone, that the surface is finished in a matte metallic color tone in which the specular gloss tone is suppressed on the contrary, and that characters and symbols are made to look three-dimensional.

As a technology for making the characters, the symbols, and the like look three-dimensional, JP 2003-109450 A discloses a technology of forming an irregular surface so that display portions formed on a resin outer side surface and a peripheral portion thereof can be different from each other in surface roughness. Further, JP 11-320570 A discloses a technology of forming a three-dimensional irregular pattern on an inside of a molded body, in which the irregular pattern is formed on a surface of a resin film by printing in advance, and the surface is covered with a different resin so that irregularities of the irregular pattern can be filled therewith.

However, in the method described in JP 2003-109450 A, the difference of the surface roughness is made by using a metal mold or by transferring marks so that the display portions are made to emerge. Accordingly, it is difficult to form complicated designs and patterns. Further, it is pointed out that, when the metal mold is used, there is an economical problem that a variety of metal molds are necessary according to types of the display portions, and when the marks are transferred, there is such a problem that breakage and deformation of the molded bodies are prone to occur. In the method described in JP 11-320570 A, since the irregularities sealed in the inside of the resins are visually recognized by using a difference in optical reflectance, there are problems in that the resins which can be used are limited, and that the irregularities are difficult to be seen even if selection is made among the resins.

SUMMARY OF THE INVENTION

In this connection, the present invention may realize a novel decorative molded body structured so that an inside thereof looks three-dimensional, the novel decorative molded body being a substitute for the above-described related art.

A decorative molded body, which is structured such that an inside thereof looks three-dimensional from a surface of a molded body, includes a three-dimensional base pattern layer including, on a bottom surface of the transparent molded body, a transparent printing layer and a brilliant layer containing brilliant particles, in which the brilliant layer is raised brightly and three-dimensionally on the transparent printing layer as a background.

The decorative molded body includes the three-dimensional base pattern layer having the transparent printing layer and the brilliant layer containing the brilliant particles on the bottom surface of the transparent molded body, in which the brilliant layer is raised brightly and three-dimensionally on the transparent layer as the background. Accordingly, irregular shapes formed of portions where the transparent printing layer is provided and other portions can look three-dimensional from a surface of the molded body. Therefore, a decorative molded body excellent in design can be formed. Further, the transparent printing layer can be formed of transparent resin ink, and the brilliant layer can be formed of resin ink containing the brilliant particles, thereby making it possible to easily provide the transparent printing layer and the brilliant layer by a printing method such as silkscreen printing to form the three-dimensional base pattern layer. Therefore, it is possible to manufacture a decorative molded body having a structure in which a degree of freedom in design is high, manufacturing cost is low, and the inside looks clear and three-dimensional. Note that, here, the term "transparent" includes a chromatically transparent case and a cloudy transparent case besides a water-clear case. The transparent printing layer only needs to be one through which the irregular shapes can be seen.

A content of the brilliant particles in a total solid content of the brilliant layer can be set at 3 wt % to 85 wt %. Since the content is set at 3 wt % to 85 wt %, the irregular shapes formed of the portions where the transparent printing layer is provided and of the other portions can look clear and three-dimensional from the surface of the molded body. Further, by increasing and decreasing the content of the brilliant particles within the above-described range, the brilliant layer can be formed into a translucent brilliant layer and an opaque brilliant layer, and a decorative molded body excellent in design can be formed in accordance with a layer construction of the decorative portion decorating the molded body.

Further, the decorative molded body in which the brilliant layer contains scaly or scaly foil-like brilliant particles becomes one in which the brilliant layer is excellent in optical reflectance. Accordingly, the decorative molded body can be made into one excellent in design, in which shadows of the portions where the transparent printing layers are provided are reflected on the brilliant layer and so on to provide three-dimensional and clear look.

Further, a display layer for displaying a character, a symbol, and the like can be formed separately from the three-dimensional base pattern layer. The display layer displaying the character, the symbol, the number, and the like is formed separately from the three-dimensional base pattern layer, and accordingly, the decorative molded body can be made into one in which the display layer can be visually recognized in the three-dimensional base pattern.

The display layer can be made into a layer which does not substantially contain the brilliant particles. If the display layer is the layer which does not substantially contain the brilliant particles, in the portions where the display layers are visually recognized, it is difficult to provide the three-dimensional look. Therefore, the decorative molded body can be made into the one in which the two-dimensional characters, symbols, and the like can be seen on the background formed of the three-dimensional base pattern layer. Note that the phrase "does not substantially contain the brilliant particles" implies that the brilliant particles are contained only in a so small quantity that the shape formed by the transparent printing layer cannot look three-dimensional even if some of the particles are contained as well as that the brilliant particles are not contained at all.

Further, the decorative molded body can be made into one in which the display layer is provided on the bottom surface of the molded body through the brilliant layer, and the brilliant layer is a translucent layer through which it is possible to visually recognize the display layer. The display layer is provided on the bottom surface of the molded body through the brilliant layer, and the brilliant layer is made as the translucent layer through which it is possible to visually recognize the display layer. Accordingly, even if the brilliant layer and the display layer are stacked in this order in a direction of viewing the molded body, the display layer can be visually recognized through the brilliant layer.

The display layer for displaying the characters, the numbers, the symbols, the diagrams, and the like and the brilliant layer can be stacked to each other in the direction of viewing the molded body. As described above, it is possible to provide the display layer at a position more distant than that of the brilliant layer from a viewer. On the contrary, it is also possible to provide the display layer at a position closer to the viewer. When the display layer is provided at the position closer to the viewer, and the display layer is formed in front of the brilliant layer, the display layer can be seen no matter how dense or pale the brilliant layer may be.

Further, the brilliant layer can be made as a translucent layer, and a pigmented layer imparting a background color to the three-dimensional base pattern layer can be provided on the bottom surface of the molded body through the brilliant layer, the background color being obtained by blending a color of the brilliant layer with a color of the pigmented layer. The brilliant layer is made as the translucent layer, and the pigmented layer imparting the background color, which is obtained by blending the color of the brilliant layer with the color of the pigmented layer, is provided on the bottom surface of the molded body through the brilliant layer. Accordingly, a color tone which is not generated only by the brilliant layer can be imparted to the three-dimensional base pattern layer.

Alternatively, on the bottom surface of the molded body, the brilliant layer and the pigmented layer can be provided parallel to each other in the direction of viewing the molded body, and the pigmented layer visually recognized from the surface of the molded body can be formed so as to display the characters, the symbols, and the like. In this case, a display layer having a color tone of the pigmented layer is formed.

The above-described decorative molded body can be used as a key top for a pushbutton switch, and can be used for a key sheet for a pushbutton switch, in which the key top is fixed and attached onto a base sheet formed of a rubber-like elastic body. The key top and key sheet for a pushbutton switch become one excellent in design, with which the inside looks three-dimensional.

According to the decorative molded body of the present invention, the key top for a pushbutton switch, which uses the decorative molded body of the present invention, and the key sheet for a pushbutton switch, a three-dimensional shape can be visually recognized in the inside of the molded body, and the molded body becomes the one excellent in decorativeness.

Contents of the present invention are not limited by the above-mentioned description, and advantages, features, and purposes of the present invention will be made more apparent by a description to be made below with reference to the accompanying drawings. Further, it is to be understood that appropriate modifications within the scope without departing from the spirit of the present invention are entirely incorporated in the scope of the present invention.

BRIEF DESCRIPTION OF THE DRAWINGS

In the accompanying drawings:

FIGS. 5A and 5B are enlarged cross-sectional views showing a process of forming decorative portions of the key top of FIG. 4, in which FIG. 5A is an enlarged cross-sectional view in which a transparent printing layer and a brilliant layer are stacked on each other, and FIG. 5B is an enlarged cross-sectional view in which the brilliant layer is removed by laser;

FIG. 9 is a cross-sectional view of a key sheet including the key tops according to the third embodiment, which corresponds to FIG. 3;

FIG. 10 is an enlarged cross-sectional view showing a process of forming decorative portions of a key top according to a fourth embodiment of the present invention;

DETAILED DESCRIPTION OF THE PREFERRED EMBODIMENTS

Figure 1:
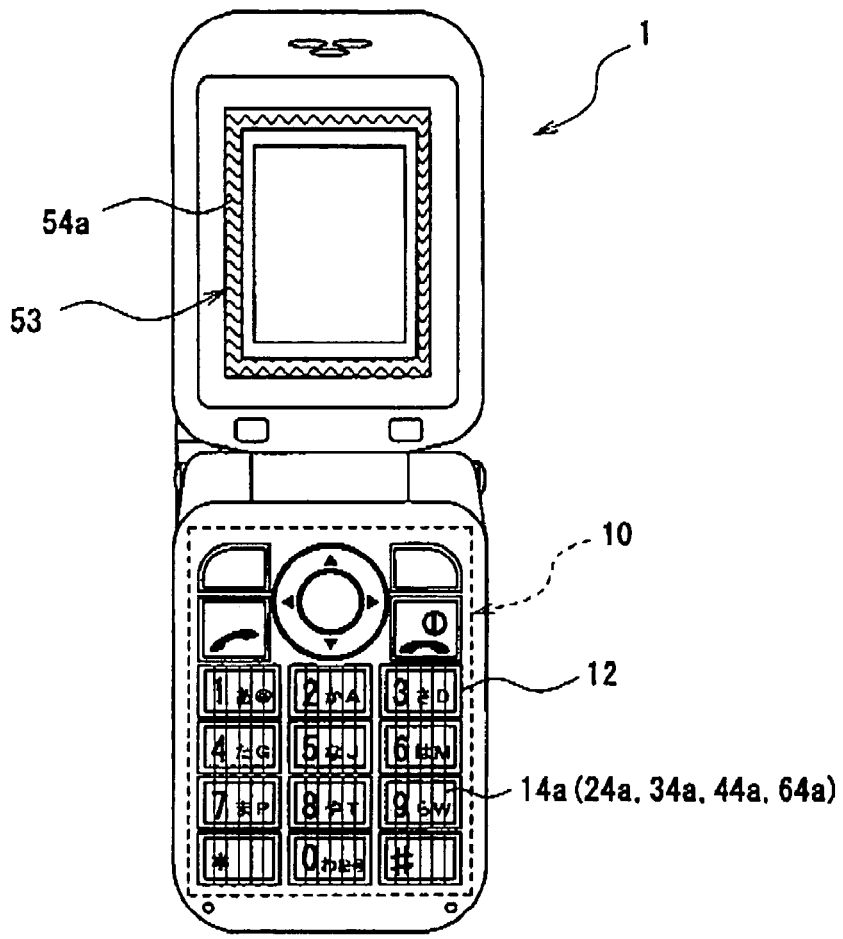
FIG. 1 is an exterior perspective view of a cellular phone.

A description will be made of embodiments of the present invention while referring to the drawings. Throughout the drawings, reference numerals denote portions and parts. Note that the same reference numerals will be assigned to the same portions in the respective embodiments, and a description thereof will be omitted.

First Embodiment {FIG. 1 to FIG. 5}

Figure 2:
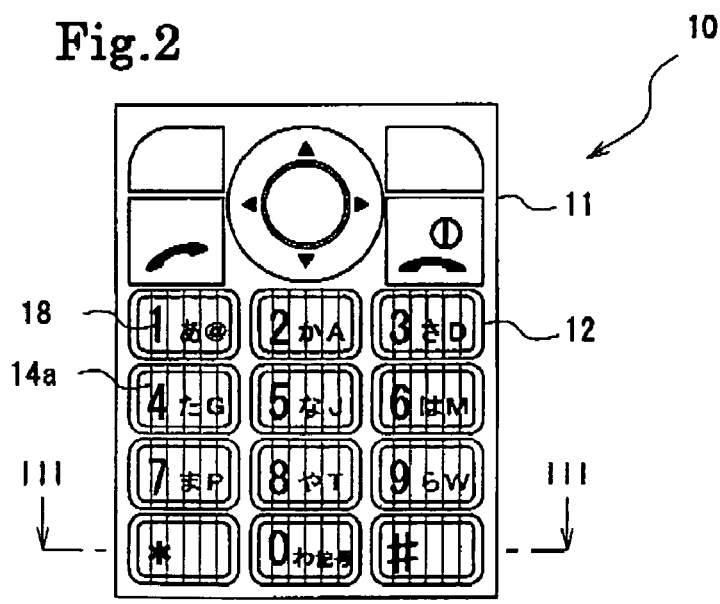
FIG. 2 is an exterior view of an upper surface of a key sheet including key tops according to a first embodiment of the present invention.
Figure 3:
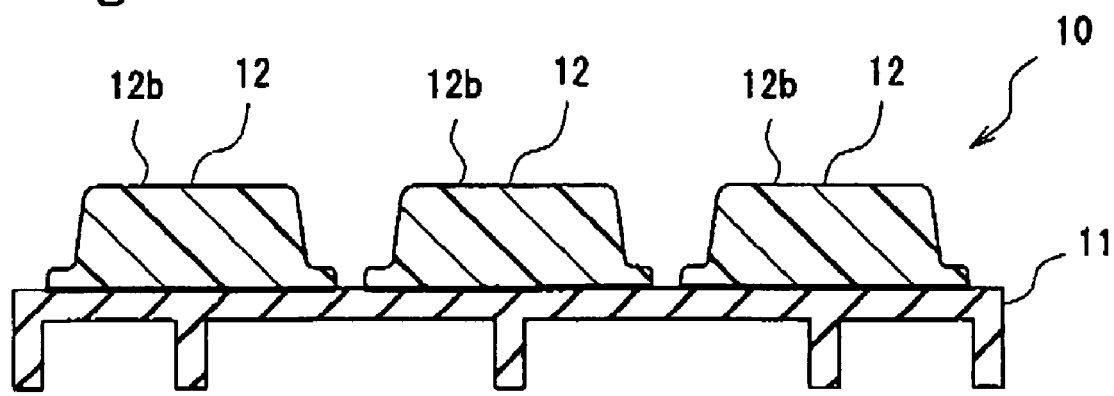
FIG. 3 is a cross-sectional view of the key sheet taken along the line III-III of FIG. 2.
Figure 4:
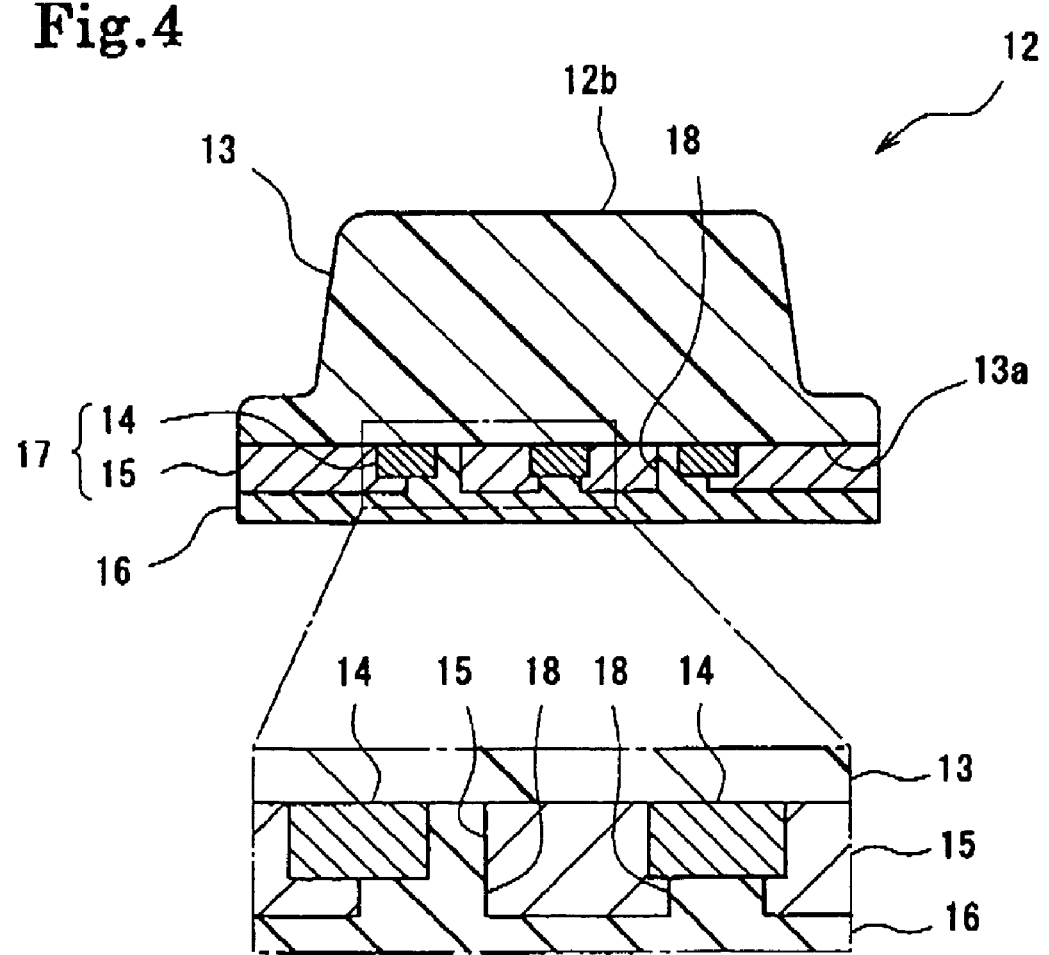
FIG. 4 is an enlarged cross-sectional view of the key top of FIG. 1.

In a first embodiment, there are shown a key sheet (10) for pushbutton switches for use in a cellular phone (1) shown in FIG. 1, and a key top (12) as a decorative molded body forming the key sheet (10) together with a base sheet (11). The key sheet (10) shown in FIG. 2 and FIG. 3 is the one in which key tops (12) to be described later in detail and the base sheet (11) made of silicone rubber and thermoplastic elastomer are attached and fixed onto each other by an adhesive (not shown). As shown in FIG. 4, in the key top (12) as the decorative molded body, a transparent printing layer (14), an brilliant layer (15), and a pigmented layer (16) are stacked on a bottom surface (13a) of a key top body (13) formed of a transparent molded body. A three-dimensional base pattern layer (17) is formed of the transparent printing layer (14) and the brilliant layer (15). The pigmented layer (16) visually recognized from a surface (12b) of the key top (12) forms a display layer (18) for displaying characters, symbols, diagrams, and the like.

The key top body (13) is a molded body which is made by using, as a material, a rigid resin including a thermoplastic resin such as polycarbonate and acrylic, a thermosetting resin such as epoxy and silicone, and the like, or in some cases, a rubber-like elastic body including silicone rubber, thermoplastic elastomer, and the like, and is obtained by a method such as injection molding and casting. It should be noted that it is necessary that these resins and the like form decorative portions (16, 17, and 18) in the variety of layers provided on the key top bottom surface (13a) and be highly transparent materials efficiently transmitting visible light therethrough so that the decorative portions (16, 17, and 18) can be visually recognized from the surface (12b) of the key top (12). Therefore, it is preferable that the resins and the like be completely transparent materials, and it is at least necessary that the resins and the like be so transparent as to have a visible light transmission of 70% or more.

The transparent printing layer (14) formed on the bottom surface (13a) of the key top body (13) is partially formed on the bottom surface (13a) of the key top body (13) by coating thereon transparent resin ink by printing means such as silkscreen printing. As an example thereof, in the key top (12) of this embodiment, which is shown in FIG. 1, FIG. 2, FIG. 3 and FIG. 4, equidistant vertical stripes (14a) are formed linearly at equal intervals on the bottom surface (13a) of the key top body (13) so as to look raised and three-dimensional.

A thickness of the transparent printing layer (14) is preferably set to 4 µm to 50 µm, more preferably, to 5 µm to 20 µm so that the transparent printing layer (14) can become visually recognizable three-dimensionally. The reason is because, when the thickness is thinner than 5 µm, the transparent printing layer (14) is difficult to look three-dimensional, and when the thickness exceeds 20 µm, the decorative portions (16, 17, and 18) become too thick, so it becomes difficult for the brilliant layer (15) to be filled in spaces in the partially provided transparent printing layer (14), a three-dimensional feeling of the transparent printing layer (14) decreases, and an appearance thereof becomes blurred. In order to set the transparent printing layer (14) to the appropriate thickness as described above, it is preferable to use resin ink of an ultraviolet cure type, which is capable of being applied in a large thickness in one printing.

The brilliant layer (15) is further stacked on the transparent printing layer (14). By a printing method such as the silkscreen printing, the brilliant layer (15) is formed by using brilliant ink, such as silver ink and pearl ink, containing a transparent binder and a brilliant colorant formed of brilliant particles. For the brilliant colorant contained in the brilliant ink, there can be used metal powders of aluminum, silver, and the like, ones obtained by forming these metals into a scaly shape or a scaly foil shape, a pearl pigment using mica and having pearl-like gloss, and the like. For the transparent binder, transparent resin suitable to disperse these brilliant colorants is used. In order to exhibit the three-dimensional feeling, a higher optical reflectance of the brilliant layer (15) is preferable, and a more content of the brilliant particles in the brilliant layer (15) is also preferable. However, considering easiness of reading the characters and the symbols, which are formed as the display layer (18), it is preferable that the content of the brilliant particles in a total solid content of the brilliant layer (15) be 3 wt % to 85 wt %. When the content becomes higher than 85 wt %, it becomes difficult to read the display layer (18), and film-forming performance and adhesion property of the brilliant layer (15) are deteriorated. Meanwhile, when the content is lower than 3 wt %, the three-dimensional feeling cannot be obtained. When the brilliant layer (15) according to this embodiment is formed as one with light shielding property, a base pattern is formed with a color tone of only the brilliant layer (15), and when the brilliant layer (15) is formed as a translucent one through which the pigmented layer (16) arranged thereunder can be seen, the base pattern is formed in a color tone in which colors of the brilliant layer (15) and the pigmented layer (16) are blended.

Figure 5A:
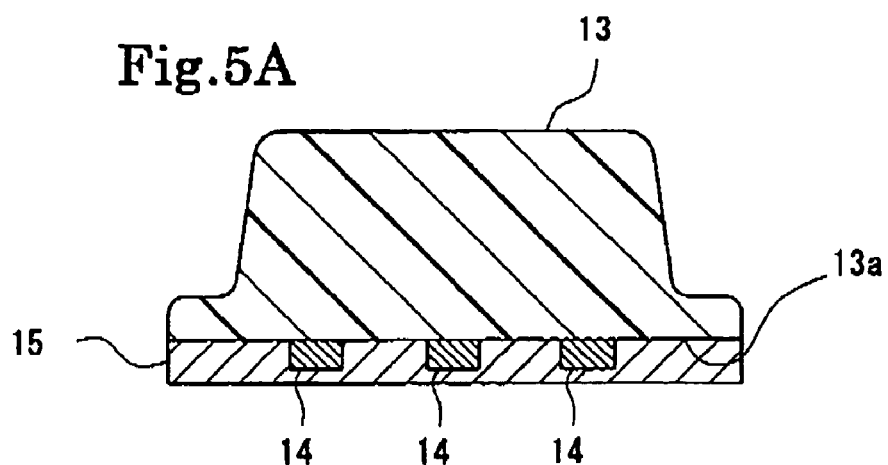
Figure 5B:
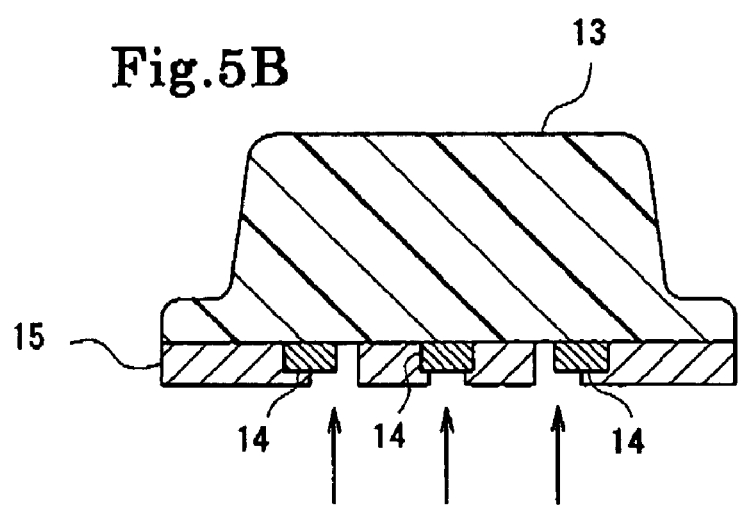

In the key top (12) shown in FIG. 4, the pigmented layer (16) which is not brilliant is further stacked on the brilliant layer (15). However, in order to form the display layer (18) for displaying the characters, the numbers, the symbols, and the diagrams, the brilliant layer (15) is removed by laser and the like in accordance with a shape of the display layer (18). Specifically, as shown in FIG. 5A, the transparent printing layer (14) and the brilliant layer (15) are stacked on the bottom surface (13a) of the key top body (13), and thereafter, as shown in FIG. 5B, the brilliant layer (15) is removed by the laser to be formed into a shape in which the characters, the symbols, and the like are displayed. In this laser processing, portions of the brilliant layer (15) containing the brilliant particles, which are irradiated with the laser, are removed, and portions of the transparent printing layer (14) formed of the highly transparent resin remain without being removed even if the portions are irradiated with the laser. Thereafter, pigmented ink which has a desired color tone and does not have brilliant property is coated on the brilliant layer (15) by the printing method such as the silkscreen printing to form the pigmented layer (16). In such the way, as shown in FIG. 4, there is obtained the key top (12) including, in a direction of being seen from the surface (12b) of the key top (12), the three-dimensional base pattern layer (17) in which the transparent printing layer (14) and the brilliant layer (15) are stacked, and the display layer (18) formed of the pigmented layer (16).

The key top (12) thus obtained has a cross-sectional structure shown in FIG. 4. When an inside of the key top (12) is seen from the surface (12b) of the key top (12), the numbers and the characters, which are formed as the display layer (18), can be observed two-dimensionally, and on the background thereof, the vertical stripes (14a) raised at equal intervals can be observed as the three-dimensional base pattern. Hence, the key top (12) excellent in design, which is visually recognized as if the two-dimensional numbers and characters are placed on the three-dimensional background, is obtained. Here, the portion where the brilliant layer (15) is provided to be stacked on the transparent printing layer (14) looks three-dimensional, and the display layer (18) as the portion where the unbrilliant pigmented layer (16) is provided to be stacked on the transparent printing layer (14) looks two-dimensional. Accordingly, it is thought that the three-dimensional base pattern layer (17) as a stacked structure of the transparent printing layer (14) and the brilliant layer (15) contributes to make the background look three-dimensional.

Figure 6:
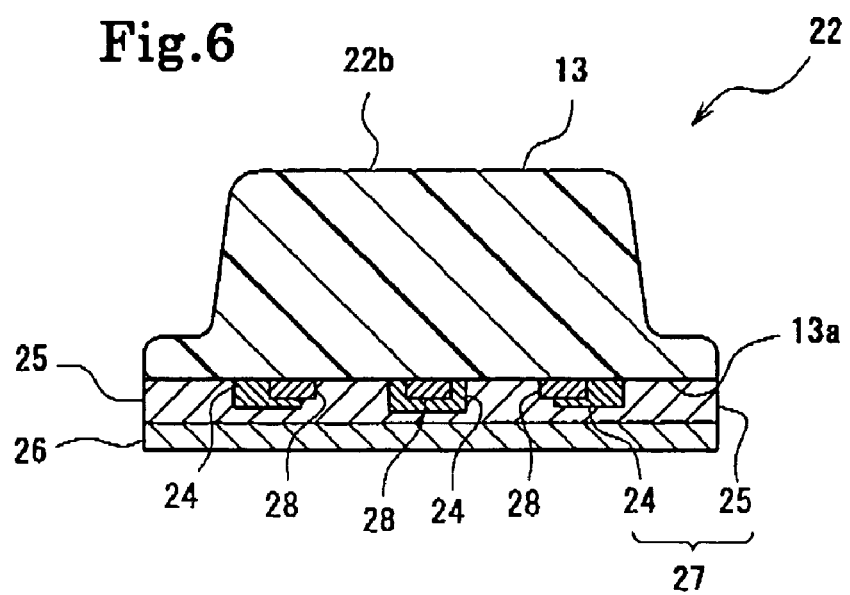
FIG. 6 is an enlarged cross-sectional view of a key top according to a second embodiment of the present invention, which corresponds to FIG. 4.
Figure 7:
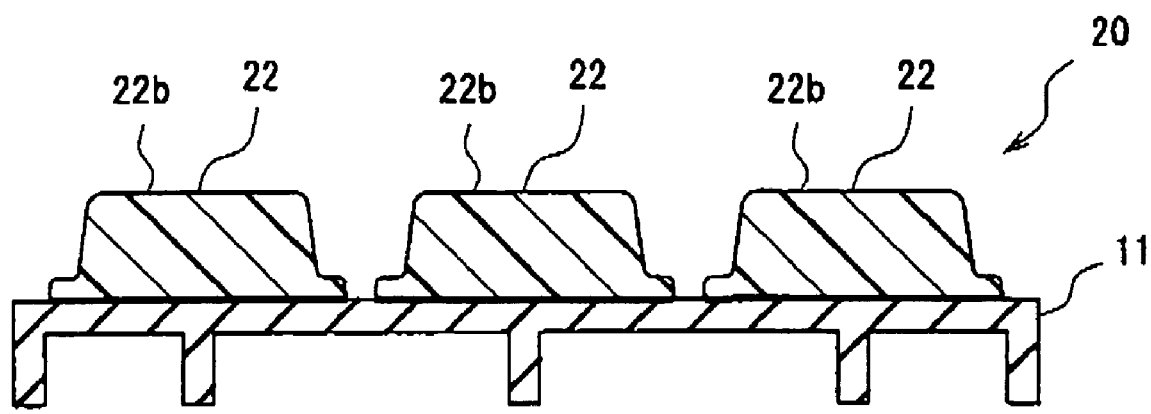
FIG. 7 is a cross-sectional view of a key sheet including the key tops according to the second embodiment, which corresponds to FIG. 3.

Second Embodiment {FIG. 6 and FIG. 7}

As shown in FIG. 6, a key top (22) of this embodiment is formed by stacking a display layer (28), a transparent printing layer (24), a brilliant layer (25), and a pigmented layer (26) in this order on the bottom surface (13a) of a key top body (13) formed of a transparent rigid molded body. Specifically, a three-dimensional base pattern layer (27) is formed of the transparent printing layer (24) and the brilliant layer (25). Materials to be used for the transparent printing layer (24) and the brilliant layer (25) are the same as those of the first embodiment. However, the brilliant layer (25) and the pigmented layer (26) are stacked on each other, and a base pattern which becomes a background of the display layer (28) is displayed in a color tone in which colors of both of them are blended. Accordingly, a color tone of printing ink for the display layer (28) and a color tone of printing ink for the pigmented layer (26) are changed from those of the first embodiment, but materials thereof may be the same as or different from those of the first embodiment. As shown in FIG. 7, the key tops (22) are also attached and fixed onto the base sheet (11) by the adhesive (not shown) to form a key sheet (20) for the pushbutton switches.

In order to form the key top (22) shown in this embodiment, the display layer (28) is printed and formed on a transparent molded body formed in advance. Next, the transparent printing layer (24) is partially formed of transparent resin ink on the bottom surface (13a) of the key top body (13) on which the display layer (28) is printed. Then, the brilliant ink is further solid-printed on the transparent printing layer (24) to form the brilliant layer (25). Finally, the pigmented layer (26) is formed on the brilliant layer (25). Then, the key top (22) is formed, which includes the display layer (28), and the three-dimensional base pattern layer (27) formed of the transparent printing layer (24) and the brilliant layer (25).

In the key top (22) thus obtained, when an inside of the key top (22) is observed from a surface (22b) of the key top (22), the numbers and the characters, which are formed as the display layer (28), can be observed two-dimensionally, and on the background thereof, vertical stripes (24a) (refer to FIG. 1) raised at equal intervals can be observed as the three-dimensional base pattern. Hence, the key top (22) excellent in design, which is visually recognized as if the two-dimensional numbers and characters are placed on the three-dimensional background, is obtained.

Figure 8:
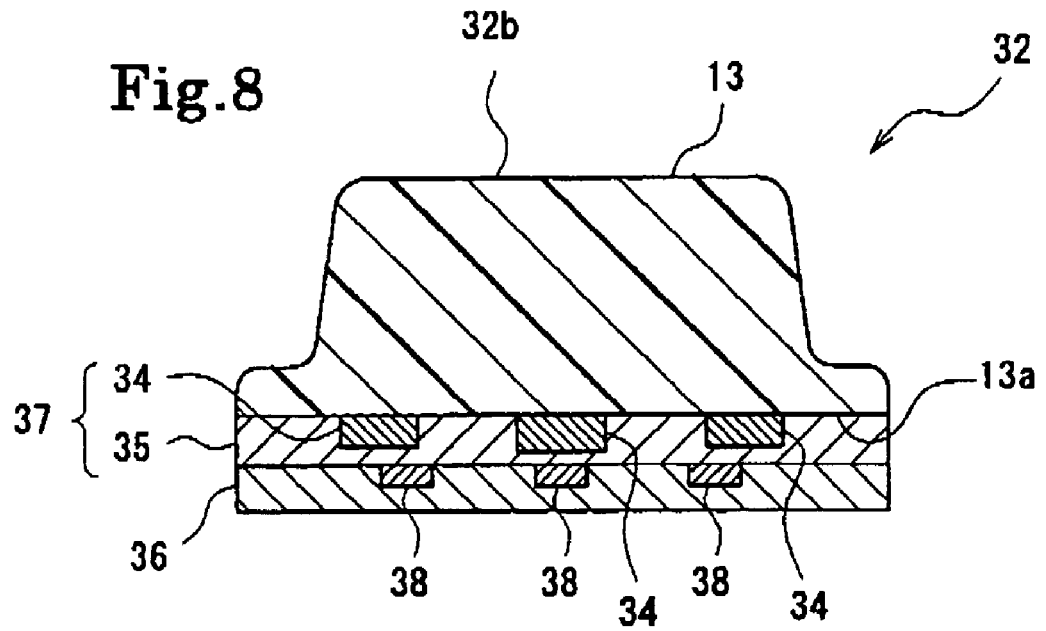
FIG. 8 is an enlarged cross-sectional view of a key top according to a third embodiment of the present invention, which corresponds to FIG. 4.

Third Embodiment {FIG. 8 and FIG. 9}

As shown in FIG. 8, a key top (32) of this embodiment has a construction, in which a transparent printing layer (34) and a brilliant layer (35) are formed on the bottom surface (13a) of the key top body (13) formed of the transparent rigid molded body, a display layer (38) is then provided thereon, and a pigmented layer (36) is further stacked thereon. Specifically, a three-dimensional base pattern layer (37) is formed of the transparent printing layer (34) and the brilliant layer (35). The respective layers are individually formed by the printing method such as the silkscreen printing. Further, for materials used for the transparent printing layer (34), the display layer (38), and the pigmented layer (36), which are stacked on the key top body (13), similar materials to those used in the second embodiment can be used. However, since it is necessary for the display layer (38) to be visually recognized through the brilliant layer (35), a material so translucent that the display layer (38) can be seen therethrough is required for the brilliant layer (35). As shown in FIG. 9, the key top (32) is also fixed and attached onto the base sheet (11) by the adhesive (not shown) to form a key sheet (30) for the pushbutton switches.

In the key top (32) thus obtained, when an inside of the key top (32) is seen from a surface (32b) of the key top (32), vertical stripes (34a) (refer to FIG. 1) raised at equal intervals from the three-dimensional base pattern layer (37) obtained from the transparent printing layer (34) and the brilliant layer (35) are observed as the three-dimensional base pattern. Further, the numbers and the characters, which are formed as the display layer (38), are observed.

Figure 11:
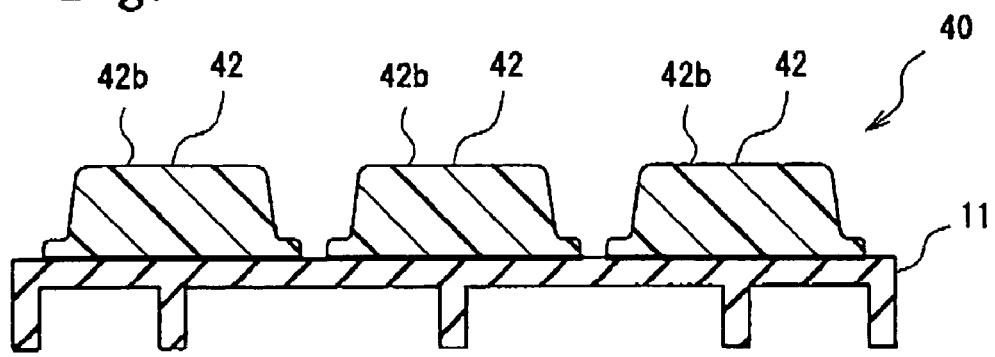
FIG. 11 is a cross-sectional view of a key sheet including the key tops according to the fourth embodiment, which corresponds to FIG. 3.

Fourth Embodiment {FIG. 10 and FIG. 11}

In a key top (42) for a pushbutton switch, which is shown in a fourth embodiment, a brilliant layer (45) is formed by using a decorative transfer film (45a) instead of forming the brilliant layer (25) by using the brilliant ink in the manufacturing process of the key top (22), which is shown in the second embodiment. Specifically, the decorative transfer film (45a) including a metal-deposited layer (45c) and a transparent adhesive layer (45d) on a base film (45b) is used, and as shown in FIG. 10, the decorative transfer film (45a) is press-transferred to the bottom surface (13a) of the key top body (13) on which a display layer (48) and a transparent printing layer (44) are provided, a base film (45b) is peeled off from the decorative transfer film (45a), and thereafter, a pigmented layer (46) is formed. Then, the key top (42) is formed, which includes a three-dimensional base pattern layer (47) formed of the transparent printing layer (44) and the brilliant layer (45), and the display layer (48). As shown in FIG.11, the key tops (42) are also attached and fixed onto the base sheet (11) by the adhesive (not shown) to form a key sheet (40) for the pushbutton switches. Note that, the decorative transfer film (45a) may include a peeling layer for facilitating the transfer of the metal-deposited layer (45c) and a protection layer for protecting the metal-deposited layer (45c) between the metal-deposited layer (45c) and the base sheet (45b). Further, such a modification may be applied that a layer containing the brilliant particles, which is provided by printing, is formed instead of the metal-deposited layer (45c).

The key top (42) of this embodiment uses the decorative transfer film (45a). Accordingly, it is preferable that a thickness of the transparent printing layer (44) do not exceed 10 μm, and it is more preferable that the thickness be approximately 4 μm to 6 μm.

In the key top (42) thus obtained, when an inside of the key top (42) is seen from a surface (42b) of the key top (42), vertical stripes (44a) (refer to FIG. 1) raised at equal intervals are observed as the three-dimensional base pattern. Further, the numbers and the characters, which are formed as the display layer (48), are observed.

Figure 12:
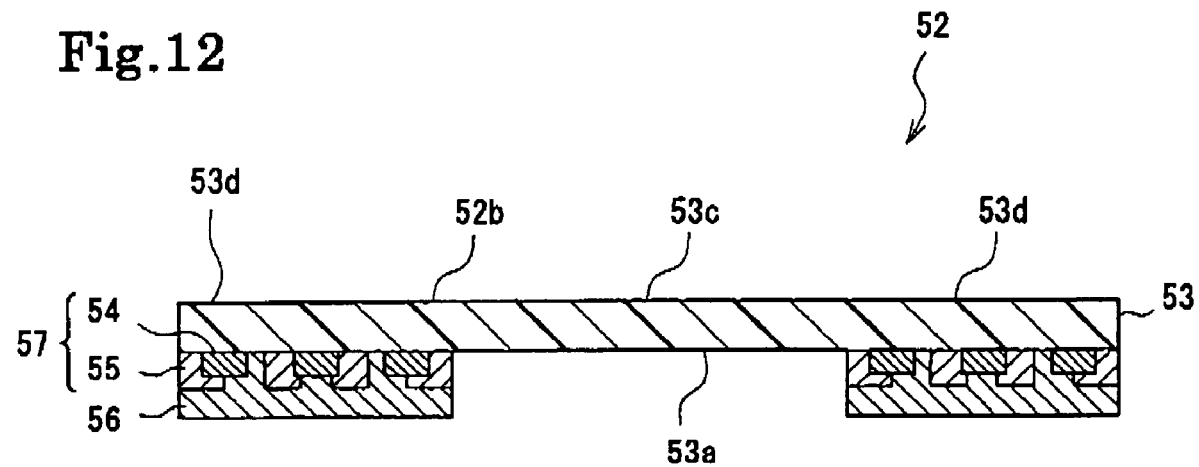
FIG. 12 is an enlarged cross-sectional view of a cover member for a liquid crystal display according to a fifth embodiment of the present invention.

Fifth Embodiment {FIG. 12}

A decorative molded body shown as a fifth embodiment is a cover member (52) for a liquid crystal display, which is disposed on a liquid crystal panel (not shown), shields the liquid crystal panel, and decorates a periphery of the liquid crystal panel. The cover member (52) for a liquid crystal display is used for the cellular phone 1 shown in FIG. 1. As shown in a cross-sectional view of FIG. 12, the cover member (52) for a liquid crystal display includes decorative portions (54, 55, and 56) consisting of a pigmented layer (56) and a three-dimensional base pattern layer (57) in which a transparent printing layer (54) and a brilliant layer (55) are stacked on a bottom surface (53a) of a liquid crystal protection cover (53) formed of a transparent flat molded body. Note that the decorative portions (54, 55, and 56) are formed on a periphery (53d) going around a center portion (53c) of the bottom surface (53a) of the liquid crystal protection cover (53) so as not to degrade viewability of the liquid crystal display.

Materials to be used for the cover member (52) for a liquid crystal display are the same materials as those used in the key top (12) shown in the first embodiment, but are different therefrom in that the display layer (18) is not provided and the transparent printing layer (54) is provided in a wave shape.

In the cover member (52) for a liquid crystal display, when an inside thereof is seen from a surface (52b) thereof, a wave pattern (54a) raised in a wave shape on the periphery (53d) is observed. Moreover, the three-dimensional base pattern layer (57) formed of the transparent printing layer (54) and the brilliant layer (55) is not provided on the center portion (53c) of the cover member (52) for a liquid crystal display, and accordingly, a display image shown on the liquid crystal display panel can be displayed without being shielded.

Figure 13:
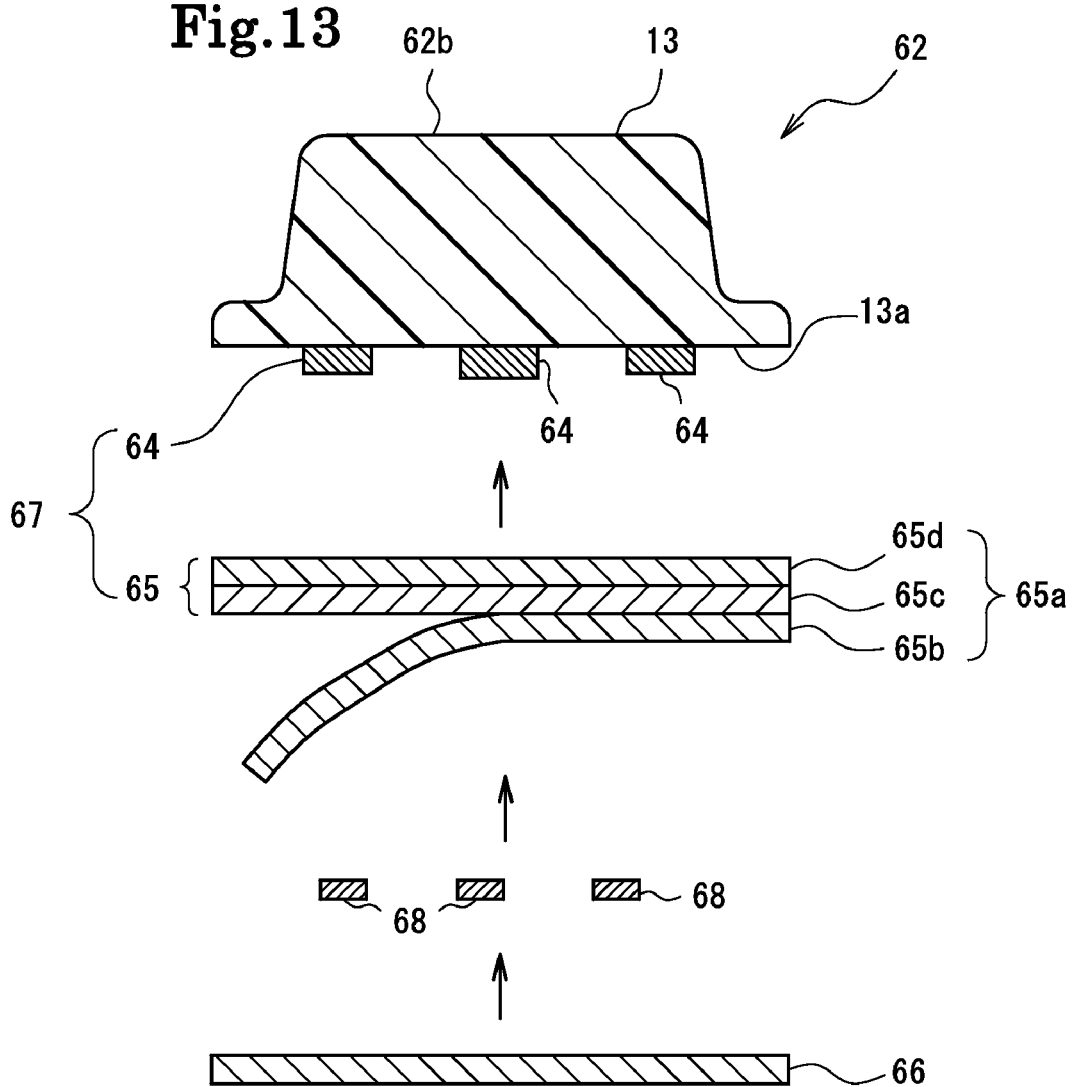
FIG. 13 is an enlarged cross-sectional view showing a process of forming a decorative portion of a key top according to a sixth embodiment of the present invention.
Figure 14:
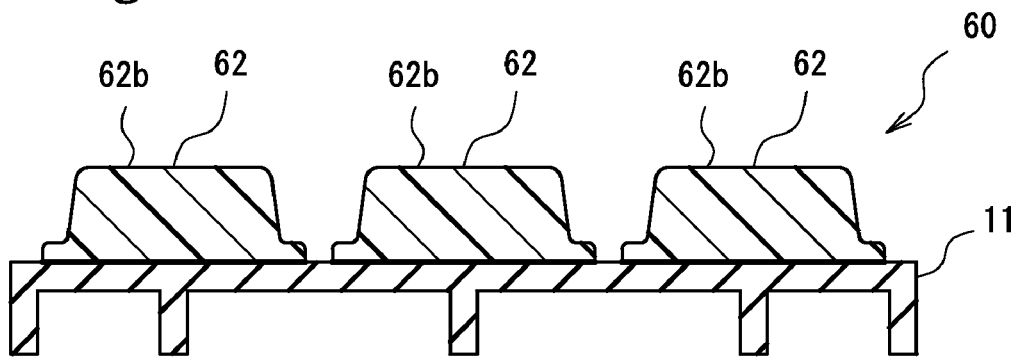
FIG. 14 is a cross-sectional view of a key sheet including the key tops according to the sixth embodiment, which corresponds to FIG. 3.

Sixth Embodiment {FIG. 13 and FIG. 14}

In a key top (62) for a pushbutton switch, which is shown in a sixth embodiment, a brilliant layer (65) is formed by using a decorative transfer film (65a) instead of forming the brilliant layer (35) by using the brilliant ink in the manufacturing process of the key top (32), which is shown in the third embodiment. Specifically, the decorative transfer film (65a) including a metal-deposited layer (65c) and a transparent adhesive layer (65d) on a base film (65b) is used, and as shown in FIG. 13, the decorative transfer film (65a) is press-transferred to the bottom surface (13a) of the key top body (13) on which the transparent printing layer (64) is provided, the base film (65b) is peeled off from the decorative transfer film (65a), and thereafter, a display layer (68) and a pigmented layer (66) are sequentially formed. Then, the key top (62) is formed, which includes the transparent printing layer (64), the brilliant layer (65), the display layer (68), and the pigmented layer (66). Specifically, a three-dimensional base pattern layer (65) (which may include the pigmented layer (66) or not) is formed by stacking of the transparent printing layer (64) and the brilliant layer (65). Further, as materials to be used for the transparent printing layer (64), the display layer (68), and the pigmented layer (66), which are stacked on the key top body (13), similar materials to those used in the third embodiment can be used. However, since it is necessary for the display layer (68) to be visually recognized through the brilliant layer (65), a material so translucent that the display layer (68) can be seen therethrough is required for the brilliant layer (65). As shown in FIG. 14, the key tops (62) are also attached and fixed onto the base sheet (11) by the adhesive (not shown) to form a key sheet (60) for the pushbutton switches. Note that, like the decorative transfer film (45a), the decorative transfer film (65a) may include the peeling layer for facilitating the transfer of the metal-deposited layer (65c) and the protection layer for protecting the metal-deposited layer (65c) between the metal-deposited layer (65c) and the base sheet (65b). Further, such a modification may be applied that a layer containing the brilliant particles, which is provided by printing, is formed instead of the metal-deposited layer (65c).

The key top (62) of this embodiment uses the decorative transfer film (65a). Accordingly, it is preferable that a thickness of the transparent printing layer (64) do not exceed 10 μm, and it is more preferable that the thickness be approximately 4 μm to 6 μm.

In the key top (62) thus obtained, when an inside of the key top (62) is seen from a surface (62b) of the key top (62), vertical stripes (64a) (refer to FIG. 1) raised at equal intervals from the three-dimensional base pattern layer (67) obtained from the transparent printing layer (64) and the brilliant layer (65) are observed as the three-dimensional base pattern. Further, the numbers and the characters, which are formed as the display layer (68), are observed.

Modification Example of Embodiment

A variety of modifications are possible for the key tops (12, 22, 32, 42, and 62), the key sheets (10, 20, 30, 40, and 60), and the cover members (52) for liquid crystal displays, which are shown in the above-described embodiments.

Combinations of the shapes of the molded bodies, the display layers (18, 28, 38, 48, and 68), and the transparent printing layers (14, 24, 34, 44, and 64) are not limited to those shown in the above-described embodiments, and a variety of combinations are possible. For example, instead of the stripe transparent printing layer (14) shown in the first embodiment, the wavy transparent printing layer (54) shown in the fifth embodiment can be formed. Further, it is also possible to further form layers other than those specifically described in the embodiments, for example, function-imparting layers such as light-diffusing layers on the pigmented layers (16, 26, 36, 46, 56, and 66).

The decorative molded bodies may be a variety of members other than the key tops (12, 22, 32, 42, and 62) and the cover member (52) for a liquid crystal display. Further, though it has been described that the molded bodies are made of the resin, the molded bodies only need to be transparent, and a material other than the resin, for example, glass can also be used.

It has been described in the above-described embodiments that the three-dimensional base pattern layers (17, 27, 37, 47, and 67) are provided on the backgrounds of the display layers (18, 28, 38, 48, and 68) displaying the characters, the symbols, and the like so as to be separated therefrom. However, when the transparent printing layers (14, 24, 34, 44, and 64) are formed into shapes of the characters, the symbols, and the like, characters, symbols, and the like, which look three-dimensional, can be formed.

EXAMPLES

Next, the present invention will be described in more detail by showing examples and comparative examples. However, the present invention is not limited to the following examples.

Example 1 {FIG. 4}

The key top (12) having the layer construction shown in the first embodiment was manufactured. The key top (12) is used for the cellular phone (1). On the bottom surface (13a) of the key top body (13) made of a polycarbonate resin, which was obtained by molding the polycarbonate resin into a predetermined shape, a plurality of parallel straight lines with a thickness of 10 μm were silkscreen printed by using transparent light-transmissive resin ink of an ultraviolet curing type ("Raycure PF4200 Medium" (trade name); made by Jujo Chemical Co., Ltd.). In such the way, the transparent printing layer (14) was obtained. Next, silver ink ("MIR-9100 Mirror Silver" (trade name); made by Teikoku Printing Inks Mfg. Co., Ltd.) containing, as the brilliant particles, scaly foil-like aluminum powder by 85 wt % with respect to the total solid content was solid-printed on the transparent printing layer (14). In such the way, the opaque brilliant layer (15) with a thickness of 4 μm was provided. Then, the laser is irradiated onto desired regions of the brilliant layer (15), and the brilliant layer (15) was removed into the shape in which the numbers and the characters are displayed. Here, the brilliant layer (15) of the portions irradiated with the laser was removed, but the transparent layer (14) thereof remained without being removed. Thereafter, unbrilliant black ink ("MIR-911 Black" (trade name); made by Teikoku Printing Inks Mfg. Co., Ltd.) was solid-printed to be stacked on the brilliant layer (15), and the pigmented layer (16) was thereby formed. In such the way, a key top (12) of Sample 1 was obtained. The key top (12) is a key top which has the silver vertical stripes (14a) looking three-dimensional as the background, and in which the black numbers and characters look two-dimensional.

Example 2 {FIG. 6}

The key top (22) having the layer construction shown in the second embodiment was manufactured. On the bottom surface (13a) of the key top body (13) made of a polycarbonate resin, which was obtained by molding the polycarbonate resin into a predetermined shape, the display layer (28) was printed into the shapes of the numbers and the characters by using unbrilliant black ink, i.e., a black ink substantially free from containing brilliant particles, ("MIR-911 Black " (trade name); made by Teikoku Printing Inks Mfg. Co., Ltd.). Then, the transparent printing layer (24) was formed by a similar method to that of Example 1 by using similar materials to those of Example 1. Then, brilliant ink in which the content of the brilliant particles was 3 wt % which was smaller than that of the brilliant ink used in Example 1 was printed on the transparent printing layer (24). In this case, the printed brilliant ink was ink prepared by dispersing a scaly pearl pigment into "Cav Transparent 800 Medium" (trade name); made by Seiko Advance Ltd. so that the pearl pigment would be 3 wt %. In such the way, the translucent brilliant layer (25) with a thickness of 3 to 4 μm was formed. Finally, unbrilliant blue ink, i.e., a blue ink that is substantially free from containing brilliant particles, ("Cav Meiban 440 Blue" (trade name; made by Seiko Advance Ltd.) was solid-printed on the brilliant layer (25) to form the pigmented layer (26). In such the way, a key top (22) of Sample 2 was obtained. The key top (22) is a key top which has the bluish white vertical stripes (24a) looking three-dimensional as the background, and in which the black numbers and characters look two-dimensional.

Example 3 {FIG. 8}

The key top (32) having the layer construction shown in the third embodiment was manufactured. The material and process for providing the transparent printing layer (34) on the bottom surface (13a) of the key top body (13) are the same as those of Example 1. Next, the translucent brilliant layer (35) was formed in a similar way to Example 1 by using the brilliant ink used in Example 2. Then, the display layer (38) was printed and formed on the brilliant layer (35) by using the same black ink as that of Example 2, and finally, the pigmented layer (36) was formed of the same blue ink as that of Example 2. In such the way, a key top (32) of Sample 3 was obtained. The key top (32) is a key top which has the bluish white vertical stripes (34a) looking three-dimensional as the background, and in which the black numbers and characters look two-dimensional.

Comparative Example 1

A key top of Sample 4 was manufactured in a similar way to Example 1 except that the unbrilliant blue ink used in Example 2 was used instead of the silver ink for the brilliant layer (15), which was used in Example 1. In the key top of Sample 4, the black numbers and characters are seen on the blue background. However, any of the numbers, the characters, and the background base pattern does not look three-dimensional.

Comparative Example 2

A key top of Sample 5 was manufactured in a similar way to Example 2 except that the brilliant layer (25) in Example 2 was not formed. In the key top of Sample 5, the black numbers and characters are seen on the blue background. However, any of the numbers, the characters, and the background does not look three-dimensional.

What is claimed is:

1. A decorative molded body comprising:
   a transparent molded body includes a top surface and a bottom surface spaced from the top surface; and
   a three-dimensional base pattern layer which is provided on the bottom surface of the transparent molded body; and
   a pigmented layer on the bottom surface of the transparent molded body;
   wherein the three-dimensional base pattern layer includes a transparent printing layer and, a brilliant layer,
   the transparent printing layer includes a first surface and a first outer boundary; the first surface and the first outer boundary cooperate to define the perimeter of the transparent printing layer; the first surface directly contacts the bottom surface of the transparent molded body at a first portion of the bottom surface and the transparent printing layer is provided by a transparent resin ink,
   the brilliant layer includes a second surface, an second inner boundary, and a second outer boundary; the second surface, the second inner boundary, and the second outer boundary cooperate to define the perimeter of the brilliant layer; the second inner boundary directly contacts the first outer boundary of the transparent printing layer and the second surface directly contacts the bottom surface of the transparent molded body at a second portion of the bottom surface different from the first portion of the bottom surface, the brilliant layer including a plurality of brilliant particles,
   the pigmented layer includes a third surface, a third inner boundary, and a third outer boundary; the third surface, the third inner boundary, and the third outer boundary cooperate to define the perimeter of the pigmented layer; the third surface directly contacts the bottom surface of the transparent molded body at a third portion different from the first portion and the second portion of the bottom surface; the third inner boundary directly contacts each of the second outer boundary of the brilliant layer and the first outer boundary of the tranparent printing layer; and
   when the transparent molded body is viewed from beyond the top surface in a direction extending from the top surface to the bottom surface, the brilliant layer cooperates with the transparent printing layer to define a three-dimensional effect.

2. A decorative molded body according to claim 1, wherein a content of the brilliant particles in a total solid content of the brilliant layer is 3 wt % to 85 wt %.

3. A decorative molded body according to claim 1, wherein the brilliant layer contains brilliant particles of one of a scaly shape and a scaly foil shape.

4. A decorative molded body according to claim 1, wherein the pigmented layer forms a display layer for displaying at least one of a character, a symbol, a number, or a diagram, the display layer being provided separately from the three-dimensional base pattern layer.

5. A decorative molded body according to claim 1, wherein the brilliant layer is made as a translucent layer, and the pigmented layer imparts a background color to the three-dimensional base pattern layer, the background color being obtained by blending a color of the brilliant layer with a color of the pigmented layer.

6. A decorative molded body according to claim 1, wherein the brilliant layer is a metal-deposited layer containing brilliant particles formed by deposition.

7. A decorative molded body according to claim 4, wherein the display layer is a layer which is free from containing the brilliant particles.

8. A decorative molded body according to claim 1, wherein the pigmented layer forms a display layer for displaying at least one of a character, a symbol, a number, or a diagram,
the display layer is provided on a portion of the brilliant layer, and the brilliant layer is a translucent layer.

9. A decorative molded body according to claim 1, wherein the transparent printing layer is formed linearly at equal intervals on the bottom surface of the transparent molded body.

10. A decorative molded body according to claim 6, wherein the pigmented layer forms a display layer for displaying at least one of a character, a symbol, a number, or a diagram, the display layer being provided separately from the three-dimensional base pattern layer.

11. A decorative molded body according to claim 10, wherein the brilliant layer is made as a translucent layer, and the pigmented layer imparts a background color to the three-dimensional base pattern layer, the background color being obtained by blending a color of the brilliant layer with a color of the pigmented layer.

12. A decorative molded body according to claim 10, wherein the display layer is a layer which is free from containing the brilliant particles.

13. A key top for a pushbutton switch, comprising the decorative molded body according to claim 1.

14. A key sheet for pushbutton switches, comprising: the key top according to claim 13; and a base sheet formed of an elastic body.

15. A decorative molded body comprising:

a transparent molded body including a bottom surface;

a three-dimensional base pattern layer on the bottom surface of the transparent molded body, the three-dimensional base pattern layer including a transparent printing layer and a brilliant layer containing brilliant particles; and a pigmented layer;

wherein the transparent printing layer and the brilliant layer are each in direct contact with the bottom surface of the transparent molded body, the transparent printing layer includes a top surface and a bottom surface, the top surface facing the bottom surface of the transparent molded body and the bottom surface is parallel to the bottom surface of the transparent molded body and is spaced from the bottom surface of the transparent molded body by a first distance, the brilliant layer includes a top surface and a bottom surface, the top surface of the brilliant layer facing the bottom surface of the transparent molded body and coplanar with the top surface of the transparent printing layer, and the bottom surface of the brilliant layer is parallel to the bottom surface of the transparent molded body and spaced from the bottom surface of the transparent molded body by a second distance, where the second distance is greater than the first distance such that the brilliant layer cooperates with the transparent printing layer to define a three-dimensional effect; and the pigmented layer includes a top surface and a bottom surface, the top surface of the pigmented layer directly contacts the bottom surface of the transparent molded body, and the bottom surface of the pigmented layer is parallel to the bottom surface of the transparent molded body and is spaced from the surface of the transparent molded body by a third distance, where the third distance is greater than the second distance.

16. A decorative molded body according to claim 15, wherein the pigmented layer forms a display layer for displaying at least one of a character, a symbol, a number, or a diagram, the display layer provided on a portion of the bottom surface of the transparent molded body.

17. A decorative molded body according to claim 15, wherein the brilliant layer is a translucent layer.

* * * * *